(12) United States Patent
Sharma et al.

(10) Patent No.: US 11,910,073 B1
(45) Date of Patent: Feb. 20, 2024

(54) AUTOMATED PREVIEW GENERATION FOR VIDEO ENTERTAINMENT CONTENT

(71) Applicant: Amazon Technologies, Inc., Seattle, WA (US)

(72) Inventors: Mayank Sharma, Bhopal (IN); Prabhakar Gupta, Delhi (IN); Honey Gupta, Patna (IN); Kumar Keshav, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/819,918

(22) Filed: Aug. 15, 2022

(51) Int. Cl.
    *H04N 21/8549* (2011.01)
    *H04N 21/466* (2011.01)
    *H04N 21/472* (2011.01)

(52) U.S. Cl.
    CPC ....... *H04N 21/8549* (2013.01); *H04N 21/466* (2013.01); *H04N 21/47217* (2013.01)

(58) Field of Classification Search
    CPC ............ H04N 21/8549; H04N 21/466; H04N 21/47217
    USPC ........................................................ 386/241
    See application file for complete search history.

(56) References Cited

U.S. PATENT DOCUMENTS

| | | | |
|---|---|---|---|
| 10,645,468 B1 * | 5/2020 | Kislevitz | G06F 18/22 |
| 10,679,063 B2 * | 6/2020 | Cheng | G11B 27/10 |
| 11,064,257 B2 * | 7/2021 | Bist | H04N 21/23418 |
| 11,205,445 B1 * | 12/2021 | Sharma | H04N 21/251 |
| 11,538,461 B1 * | 12/2022 | Gupta | G10L 15/16 |
| 11,558,650 B2 * | 1/2023 | Majumdar | H04N 21/44222 |
| 11,630,999 B2 * | 4/2023 | Gangotri | G06Q 30/016 706/20 |
| 2014/0143817 A1 * | 5/2014 | Yeh | H04N 21/6587 725/100 |
| 2023/0017614 A1 * | 1/2023 | Srinivasa | G06V 20/42 |
| 2023/0049135 A1 * | 2/2023 | Su | G06V 10/82 |

OTHER PUBLICATIONS

Boreczky, J.S. and Rowe, L.A., 1996. "Comparison of video shot boundary detection techniques," Journal of Electronic Imaging, 5(2), pp. 122-129.

Reimers, N., & Gurevych, I. (2019). "Sentence-BERT: Sentence Embeddings using Siamese BERT-Networks," Proceedings of the 2019 Conference on Empirical Methods in Natural Language Processing and the 9th International Joint Conference on Natural Language Processing (EMNLP-IJCNLP), arXiv:1908.10084v1 [cs.CL] Aug. 27, 2019, pp. 1-11.

(Continued)

*Primary Examiner* — Helen Shibru
(74) *Attorney, Agent, or Firm* — Robert C. Kowert; Kowert, Hood, Munyon, Rankin & Goetzel, P.C.

(57) ABSTRACT

A respective set of features, including emotion-related features, are extracted from segments of a video for which a preview is to be generated. A subset of the segments is chosen using the features and filtering criteria including at least one emotion-based filtering criterion. Respective weighted preview-suitability scores are assigned to the segments of the subset using at least a metric of similarity between individual segments and a plot summary of the video. The scores are used to select and combine segments to form a preview for the video.

20 Claims, 10 Drawing Sheets

(56) References Cited

OTHER PUBLICATIONS

Miech, A., Alayrac, J. B., Smaira, L., Laptev, I., Sivic, J., & Zisserman, A. (2020). "End-to-End Learning of Visual Representations From Uncurated Instructional Videos," 2020 IEEE/CVF Conference on Computer Vision and Pattern Recognition (CVPR), arXiv:1912.06430v4 [cs.CV] Aug. 23, 2020, pp. 1-14.

Liu, Z. (Dec. 11, 2019). "TANet: Robust 3D Object Detection from Point Clouds with Triple Attention," Proceedings of the AAAI Conference on Artificial Intelligence, arXiv:1912.05163v1 [cs.CV] Dec. 11, 2019, pp. 1-9.

Baevski, A., et al. (Jun. 20, 2020). "wav2vec 2.0: A Framework for Self-Supervised Learning of Speech," Part of Advances in Neural Information Processing Systems 33 (NeurIPS 2020), arXiv:2006.11477v1 [cs.CL] Jun. 20, 2020, pp. 1-19.

Koutini, K. (Oct. 11, 2021). "Efficient Training of Audio Transformers with Patchout," arXiv:2110.05069v3, pp. 1-6.

Andreea-Maria Oncescu, et al., "Audio Retrieval with Natural Language Queries," Accepted at INTERSPEECH 2021, arXiv preprint: https://arxiv.org/pdf/2105.02192.pdf, 2021, pp. 1-6.

"What is Amazon Rekognition?" downloaded from https://docs.aws.amazon.com/rekognition/latest/dg/what-is.html on Jul. 3, 2022, pp. 1-5.

"Scene Detection Algorithms—PySceneDetect.pdf" file was downloaded from http://scenedetect.com/en/latest/reference/detection-methods/ on Jul. 3, 2022, pp. 1-4.

Dolley Shukla, et al., "Overview of Scene Change Detection—Application to Watermarking," International Journal of Computer Applications (0975-888), vol. 47—No. 19, Jun. 2012, pp. 1-5.

U.S. Appl. No. 17/661,165, filed Apr. 28, 2022, Amazon Technologies, Inc.

* cited by examiner

AUTOMATED PREVIEW GENERATION FOR VIDEO ENTERTAINMENT CONTENT

BACKGROUND

Video content generated by various kinds of content providers can be viewed over the Internet using streaming services. Some content providers may be large corporations, such as traditional producers of commercial films and television programs, and may have experts and resources available for generating collateral material such as previews and promoting their content. Other content providers, such as independent artists or groups of artists, may have fewer resources, making it more difficult to create collateral material for such content providers.

Figure 1:
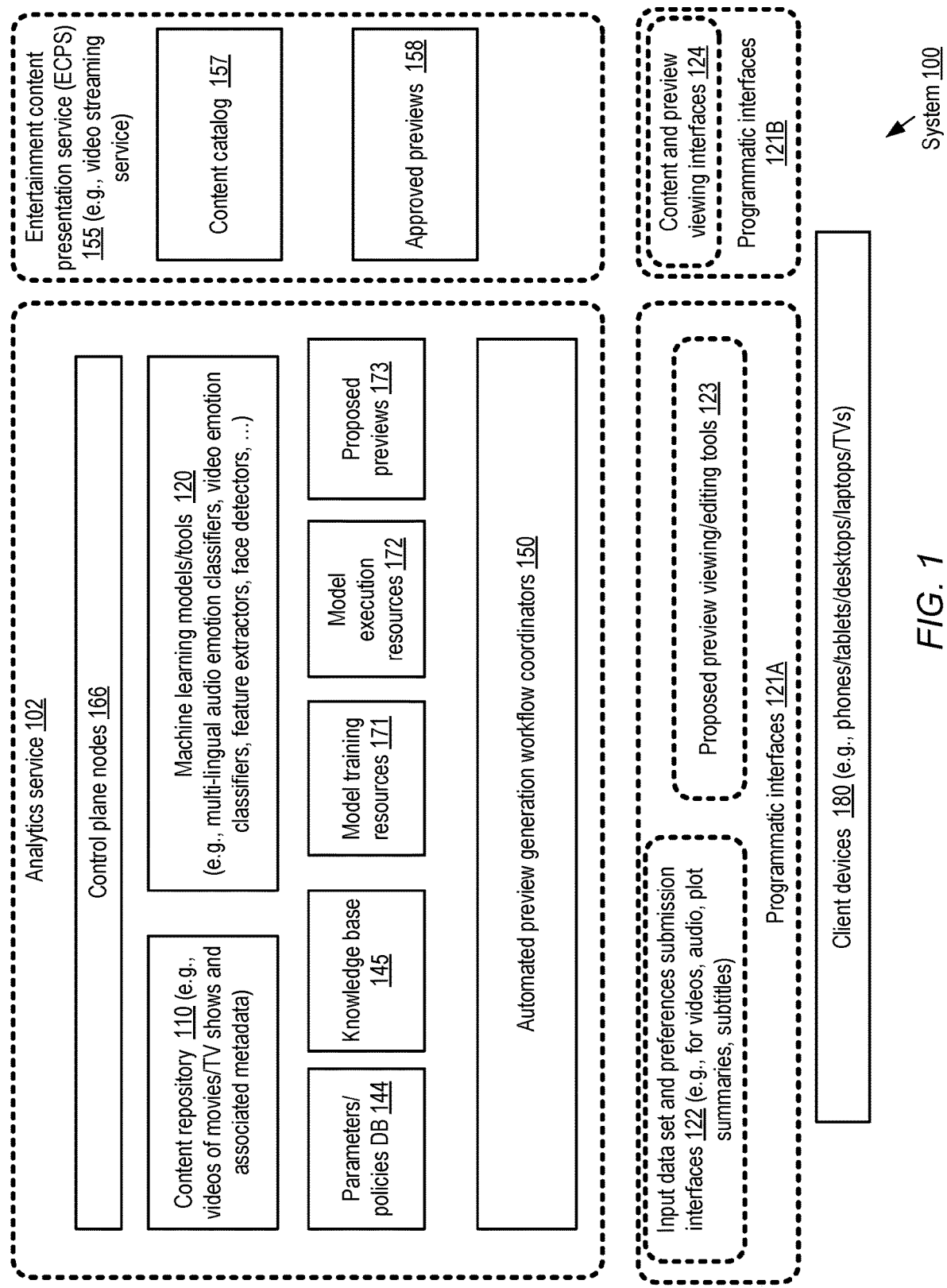
FIG. 1 illustrates an example system environment in which an analytics service of a cloud provider network may be used to automate the process of generating previews for video content, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automatically generating previews of entertainment videos such as motion pictures or television shows, regardless of the language(s) used in the videos, using machine learning and other analytics techniques along with a knowledge base to identify segments or sections of the videos that are the most suitable for inclusion in the previews. The described techniques can very quickly generate one or more proposed previews for a given video, which can then be viewed and (if desired) edited via an easy-to-use interface by the video producer or owner. Customized previews may be created for different types of viewing or preview consumption devices (e.g., phones versus large-screen TVs) and/or for different audience segments' viewing preferences in some embodiments. After a preview is approved, it may be made available to content consumers via a variety of channels in different embodiments, such as streaming video services, television channels, social media services and the like. The creators/producers of the videos may simply provide the videos and associated audio, subtitles/scripts (if available) and a short text summary of a video to an analytics service or preview generator tool in some embodiments, and the rest of the work for preparing the previews may then be done by the analytics service or preview generator tool. Easy-to-use editing interfaces which can display information about the features/factors used to generate the previews may be provided, enabling content creators to fine tune the proposed previews if desired. The tools used for generating the previews may be multi-lingual (such as emotion recognition models or emotion detectors/classifiers that have been trained using input in dozens of languages) in at least some embodiments, so videos in a variety of languages (as well as videos that include multiple languages) may be processed easily without requiring help from experts in the languages. A knowledge base that includes heuristics regarding various genres of videos may be employed in some embodiments, enabling previews of videos belonging to different genres to be generated using genre-specific or genre-based rules.

As one skilled in the art will appreciate in light of this disclosure, certain embodiments may be capable of achieving various advantages, including some or all of the following: (a) reducing the amount of computing and other resources needed to quickly prepare previews for video content in a variety of languages, (b) enhancing the user experience of content creators by providing easy-to-use interfaces for fine tuning or enhancing automatically generated proposed previews, and/or (d) improving the user experience of content consumers by generating previews that contain informative portions of the videos, while avoiding "spoilers" that may reduce the content consumers' enjoyment of the videos by revealing excessive details of the video plots.

According to some embodiments, a system may include one or more computing devices. The one or more computing devices may include instructions that upon execution on or across the one or more computing devices obtain, via one or more programmatic interfaces, an indication of an input data set including (a) a video for which a preview is to be generated automatically, (b) audio associated with the video, and (c) a text plot summary of the video. In some embodiments, the input data set may be submitted by the creator or producer of the video, referred to as an entertainment content provider, to a network-accessible analytics service of a cloud provider network. In other embodiments the input data set may be submitted to a standalone preview generator tool which does not utilize cloud-based resources for analyzing the video and preparing the preview.

The video may be divided into a sequence of segments, also referred to as scenes or sections, using a partitioning algorithm in various embodiments. In scenarios in which the video as a whole represents a narrative or story, for example, each segment may correspond to a small portion of the narrative, often taking place in a particular location and involving a particular set of characters or objects. A variety of partitioning algorithms may be used for dividing the video, which for example can automatically detect scene boundaries using statistical analyses of differences in color properties (or other visual properties) between successive frames of the video. In general, segments may vary in duration; in some embodiments, the partitioning policy may enforce an upper limit on the duration of any given segment/section. For example, in one implementation, each segment may be required to be no longer than T minutes, where T is a tunable (and in some cases learned) parameter of the algorithm. If the statistical analysis initially indicates (based on differences in color profiles between successive frames) that a particular segment should be longer than T minutes, the segment may be broken up into N segments such that none of the segments exceeds T minutes in such an implementation.

From individual ones of the segments, a respective set of features may be extracted in some embodiments, e.g., using one or more machine learning models. In at least one embodiment, a set of features extracted for a given scene may include one or more emotion-related features, such as a first emotion-related feature associated with analysis of visual content or visual elements of a segment (ignoring the audio of the segment) and a second emotion-related feature associated with analysis of audio of the segment (ignoring the visual aspects of the segment). In at least some embodiments, one or more machine learning models or tools may be used to generate a metric of similarity between a given segment and the text plot summary, e.g., by generating a representation of the segment video or audio within a particular embedding space, generating another representation of the text plot summary within the same embedding space, and computing a measure of similarity (such as a cosine similarity) between the two representations.

Based at least in part on analysis of the generated features, a subset of segments may be selected or filtered for further analysis, while other segments may be discarded in various embodiments. A collection of one or more filtering criteria may be used in different embodiment. In some embodiments, distinct filtering criteria may be used for segments that contain faces (e.g., human faces, animal faces, cartoon character faces, etc.) and for segments that do not contain faces. For face-containing segments, for example, the emotions indicated by the faces may be used as filtering criteria, and/or the angles at which the faces appear in the segments may be used as filtering criteria. If faces in a particular segment do not show a strong emotion, that segment may be filtered out in one implementation, and/or if the angles at which faces are shown is such that the faces are not easy to see, that segment may be filtered out. Among segments that do not contain faces, segments whose audio includes human speech may be filtered out, or segments whose audio categories (e.g., silence or music, detected using machine learning models) are not aligned with the genre to which the video belongs may be filtered out. Thus, genre information may be used to exclude certain segments from a proposed preview in at least some embodiments. Information about the kinds of audio that may be aligned or compatible with different genres may be stored in a knowledge base used during the generation of the preview in at least some embodiments.

Respective weighted scores, which may be referred to as weighted preview-suitability scores, may be assigned to each segment of the filtered subset of segments (the segments retained rather than rejected using the filtering criteria) in some embodiments, based on a variety of factors. The factors may include, for example, similarity scores between the segments and the text plot summary, which were generated in the feature extraction phase earlier. Weights assigned to different classes of similarity scores may be determined, in some embodiments, using a knowledge base in which weights that have proved useful for score generation for videos in various genres may be stored.

Using at least the respective weighted preview-suitability scores, some segments of the subset may be combined to form or generate a proposed preview for the video in one embodiment. For example, the highest-scoring segments from various chronological portions of the video (e.g., the first one-fourth of the video, the second one-fourth, and so on) may be combined. A spoiler avoidance policy may be employed in some embodiments, whereby segments from the final 1/kth portion (e.g., the final one-fourth of the video in chronological order) may not be included in the proposed preview, so as to avoid revealing too many details about the conclusion of the narrative being shown in the video.

The proposed preview may be presented, e.g., to the video creator, producer or other interested parties, via an interactive easy-to-use interface that allows modifications or edits to be made to the proposed preview. For example, some segments that were included in the proposed preview may be extended (backwards or forwards in time), shortened, removed entirely, or re-ordered relative to other segments using the interface, new segments may be added, and so on. After the reviewer/editor has modified the proposed preview (if modifications were needed), an approved version of the preview may be stored and presented to content consumers via a variety of channels or devices in different embodiments.

At least some of the machine learning models and analytics tools used during various stages of the preview generation workflow or process described above may be multi-lingual or language-agnostic in some embodiments. For example, a multi-lingual emotion recognition or emotion classification model may be employed in one embodiment to analyze audio of the respective segments; such a model may have been trained using input data sets in several different languages. In some embodiments, because the emotion classification model has learned to or classify emotions expressed in a variety of languages, it may be capable of correctly classifying the emotion of a video segment in which the language being used is not one of the languages on which the model was trained; that is, the model may be able to generalize to additional languages not represented in the training data.

In some embodiments, the input data set provided to the analytics service with regard to a given video may include subtitles in one or more languages. The subtitles (if any) for a given segment may serve as another source of interpretable information of the segment, and additional features (such as emotion-related features, similarity-to-plot-summary features etc.) may be extracted from the subtitles. Such features may then be utilized in subsequent stages of the preview generation, e.g., for filtering, assigning preview-suitability scores and so on. The features extracted from subtitles may be distinct from the features extracted from the visual content or the audio content of the segments in such embodiments; as such, subtitles may represent another mode of input data regarding the video (along with the video frames, audio, plot summary, genre, etc.) which can be analyzed using machine learning techniques to help identify scenes/segments that are most suitable for inclusion in previews. Subtitles in multiple languages may be used during preview generation in some embodiments, with the subtitles in each language being used as an independent or orthogonal source of information about the video, from which a respective set of features can be extracted. In some embodiments, a script of a video (indicating the dialogs of various characters) may be obtained at the analytics service, and used in a manner similar to subtitles (e.g., to generate additional features, and use the features in subsequent stages of the workflow for generating a preview). In one embodiment, the audio associated with a video may be transcribed using audio-to-text conversion tools, and the audio content transcription may be used in a manner analogous to subtitles.

In at least one embodiment, the input data set provided to the analytics service with regard to a given video may include an indication of the genre or genres (e.g., adventure, horror, romance, science fiction etc.) to which the video belongs. Such genre information may be used at various stages during the preview generation process. For example, the filtering criteria used to eliminate some segments/sections from further consideration may be genre-dependent in some embodiments. Information about various genres, such as the types of background music or spoken words most indicative or most aligned with the genre, may be maintained as part of the knowledge based used for preview generation in different embodiments. The weights assigned to different factors used to compute the preview-suitability scores may be genre-dependent in some embodiments. In one embodiment, if the genre(s) are not provided as part of the input, a machine learning model may be used to infer the genre(s) for the video, and the inferred genre(s) may be used in a similar manner.

According to some embodiments, proposed previews of different durations and/or differing visual properties may be generated with respect to a given input video for respective preview consumption target device types. For example, one proposed preview of duration D1 and video resolution R1 may be generated for display on certain classes of smart phones for a given input video, another proposed preview of duration D2 and video resolution R2 may be generated for display on tablets/laptops for the same input video, while a proposed preview of a third duration D3 and resolution R3 may be generated for display on high-end televisions for the same input video.

In one embodiment, customized proposed previews may be generated for different portions or demographics of a desired video consumer audience. For example, if consumers accessing a streaming service opt in to allow their video watching preference profiles (e.g., how often a particular consumer watched comedies as opposed to dramas) to be used for providing previews of videos they may enjoy, such preference profiles may be used to select some segments for inclusion in a customized proposed preview for a particular category or profile of video consumers, and/or to reject other segments.

As mentioned above, an analytics service used to automatically generate previews using the techniques introduced above may be implemented at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. An analytics service implemented at such a cloud computing environment may also be referred to as a machine learning service in some embodiments.

FIG. 1 illustrates an example system environment in which an analytics service of a cloud provider network may be used to automate the process of generating previews for video content, according to at least some embodiments. As shown, system 100 includes resources and artifacts of an analytics service 102 and an entertainment content presentation service (ECPS) 155. The analytics service 102 comprises a set of administrative or control plane nodes 166 and a collection of automated preview generation workflow coordinators 150, each of which may be implemented using some combination of software and hardware of one or more computing devices. The control plane nodes 166 may, for example, be responsible for provisioning resources such as servers for other components of the analytics service, monitoring health and performance of the other components and initiating configuration changes/updates and the like as needed. The entertainment content presentation service 155, which may for example comprise a video streaming service, may include a content catalog 157 (e.g., films, TV shows and the like, at least some of which may include videos for which previews are generated automatically by the analytics service) and approved previews 158 for at least a subset of the content catalog 157 in the depicted embodiment.

The analytics service 102 may implement a set of programmatic interfaces 121A for its clients, while the ECPS may implement another set of programmatic interfaces 121B for its clients in the depicted embodiment. Programmatic interfaces 121A may for example include a web-based console, command-line tools, graphical user interfaces, application programming interfaces (APIs) and the like. Programmatic interfaces 121A may include at least two broad categories of interfaces which may be used by content creators or content producers: input data set and preferences submission interfaces 122, as well as proposed preview viewing/editing tools 123. Programmatic interfaces 121B may include content and preview viewing interfaces 124, which may be employed by content consumers interested in viewing entertainment content items included in content catalog 157 and approved previews of such content items. Requests to the analytics service (e.g., pertaining to the generation/editing of previews) and requests to the ECPS may be submitted from any of a variety of client devices 180 in the depicted embodiment, such as phones, tablets, laptops, desktops, television sets, and the like.

A content producer may submit an input data set comprising a video, for which an automatically-generated preview is desired, along with associated metadata using interfaces 122 to the analytics service in the depicted embodiment. The video may comprise a sequence of frames, and the input data set may include an associated soundtrack or audio. Metadata associated with the video may comprise a text plot summary (e.g., a few hundred words describing the main points of a story or narrative being told using the video) in various embodiments. In some embodiments, a set of subtitles, which includes words/sentences and associated timing information (indicating when and for how long during the course of the video the subtitles should be shown), may be included in the metadata as well. In at least one embodiment, a content producer may also provide information about one or more genres to which the video belongs. In one embodiment, the metadata may include a script for the video. In some embodiments, if for example the script or subtitles are not available, a transcription of the spoken words of the video may be generated and included in the metadata.

The videos (or pointers to the videos) along with the associated metadata may be stored on a content repository 110 in the depicted embodiment. The automated preview generation workflow coordinators 150 may utilize various types of machine learning models/tools 120 in the depicted embodiment, along with a knowledge base 145, to generate proposed previews for submitted videos in various embodiments. The machine learning models/tools 120 may for example include multi-lingual audio-based emotion classifiers, video-based emotion classifiers, feature extractors, face detectors, video scene/segment boundary detectors, and so on. At least some of the models may comprise deep neural networks in various embodiments, although various other types of machine learning models may be employed in some embodiments. In one embodiment, in addition to machine learning models/tools, a set of statistical tools that do not use machine learning algorithms as such may be employed by workflow coordinators 150: for example, the algorithms used for partitioning videos into segments or sections for further analysis may be largely statistical in nature. In at least some embodiments, one or more of the models may be trained at the analytics service, e.g., using model training resources 171 such as a collection of high-end servers equipped with graphics processing units (GPUs) and/or machine learning accelerator hardware. In other embodiments, at least some of the models may be trained elsewhere (e.g., at some other service of a cloud provider network at which the analytics service is implemented, or at a third party machine learning resource such as a research facility) and utilized after training by the analytics service. Model execution resources 172, comprising another collection of servers, may be employed to run the models during various phases of the preview generation workflow in various embodiments.

A workflow coordinator 150 may obtain an indication of an input data set comprising a particular video and associated metadata, submitted from a client device 180 in the depicted embodiment. The workflow coordinator may then initiate a multi-step workflow which employs at least some machine learning models/tools 120 as well as entries or heuristics stored in a knowledge base 145. The workflow, discussed in further detail below in the context of FIG. 2, may eventually result in the preparation of at least one proposed preview 173 for the submitted video. The workflow may include, for example, partitioning the input data set video into smaller units or segments, extracting various features from individual segments, discarding at least some segments based on a set or collection of filtering criteria, assigning multi-factor scores to the remaining segments indicative of their suitability for inclusion in the preview, and combining at least some of the segments using the multi-factor scores in various embodiments. In some embodiments, one or more parameters and/or policies that are utilized during the preview generation workflow may be provided by the content producer and stored in a parameters/policies database 144. Such parameters and policies can include, for example, the desired total duration of the preview, an indication of the types of target audiences for the preview, the types of devices expected to be used primarily to watch the preview, spoiler avoidance policies, segment-type sequencing policies, and the like. In some cases, if the content producer does not provide values for one or more parameters, or does not provide a policy that is required for preparing a preview, the workflow coordinators may choose default parameter values and/or default policies of the analytics service. Such defaults may be indicated in the knowledge base 145 in various embodiments.

A proposed preview may be presented via viewing/editing tools 123 in the depicted embodiment. The content producer or creator, or some entity granted authorization by the owner of the video for which the proposed preview was created, may examine the proposed preview and make changes if desired. Such changes may include, among others, expanding or contracting the segments incorporated into the proposed preview (e.g., by adding adjacent frames of the original video, or by removing some frames), rejecting some of the segments entirely, adding new segments, rearranging or re-ordering the segments, and so on. In some cases, the proposed preview may be accepted as is; that is, no changes may be needed. The approved version of the preview may be stored at the analytics service 102 and/or provided to a destination such as the ECPS in the depicted embodiment. The video for which the preview was generated may be added to content catalog 157, and clients such as content consumers may utilize programmatic interfaces 121B to view the preview and/or the video for which the preview was generated. In one embodiment, for example, the ECPS content catalog 157 may comprise a collection of icons, with each icon representing a particular video. In one implementation, if and when a content consumer clicks on a particular icon (or hovers a computer mouse or cursor over the icon), an approved version of an automatically generated preview for the corresponding video may be streamed and shown to the content consumer.

Figure 2:
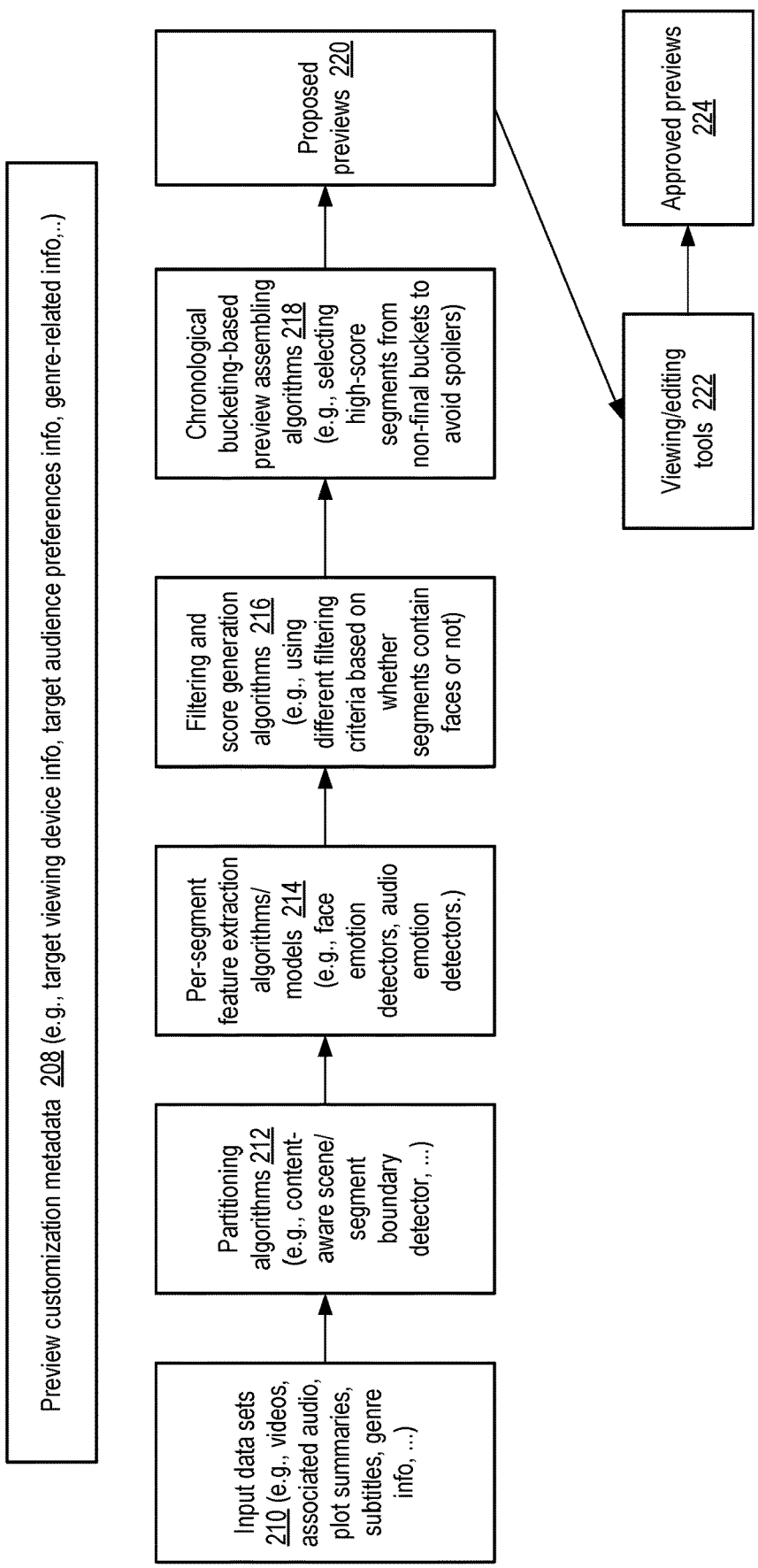
FIG. 2 illustrates an example workflow for generating previews of video content, according to at least some embodiments.

FIG. 2 illustrates an example workflow for generating previews of video content, according to at least some embodiments. Input data sets 210 of the workflow may comprise videos, associated audio, plot summaries expressed in text, subtitles/scripts/transcriptions, genre information of the videos, and so on. The videos, audio, summaries, subtitles/scripts/transcriptions and/or genre information may utilize any of a variety of languages in some embodiments, or combinations of various languages, as at least some of the tools and models used for the preview generation may be language agnostic or multi-lingual. The input data sets may be provided to an analytics service similar in features and functionality to analytics service 102 via programmatic interfaces by content creators or content owners in various embodiments in the first stage of the workflow.

In a second stage of the workflow for a particular input data set, partitioning algorithms 212 may be utilized to divide the video into segments or sections, for example with each segment/section typically a few minutes long. Segments may be generated with the intention that several of the most relevant or appealing of them can eventually be combined to form a preview for the video in various embodiments, without exceeding applicable time limits. In some embodiments, a tool similar to PySceneDetect may be employed for splitting the video. In some embodiments, a content-aware scene detector may be used, which finds parts of the video where the difference between successive frames exceeds a threshold. The color space of each frame may be converted in some implementations, e.g., from the RGB (red green and blue) color space to the HSV (hue, saturation, value) space. After the conversion, the average difference across all the channels for a pair of successive frames may be computed, or the difference in the value channel may be computed, and the difference may be compared to a threshold. In other embodiments, an adaptive content detector may be used, which uses a rolling average of differences in content between successive frames to detect segment boundaries. In various embodiments, statistics (e.g., mean differences, standard deviations of differences between frames, etc.) associated with color or other visual properties of frames may thus be used to define segment boundaries. In some embodiments, differences between color histograms, image edges/gradients, motion vectors, compression-based features such as DCTs (discrete cosine transformations), wavelet coefficients or the like may be used for dividing the video.

Per-segment feature extraction algorithms/models 214 may be utilized in the depicted embodiment to extract a respective set of features for at least some of the segments. In some embodiments, at least two classes of audio features may be generated for the audio clip corresponding to a given segment of video: speech emotion-related features and audio category features. For segments containing speech, a speech emotion recognition model that relies on a multi-lingual speech encoder (e.g., similar to the wav2vec encoder) may be employed in various embodiments. The emotion recognition model for audio, also referred to as an emotion classifier, may for example map the audio clip into one of several emotion-related categories (such as neutral, sad, surprised, happy, fearful, disgusted, etc.), or provide a histogram of the categories for each segment. In some embodiments, to help select the most informative or appealing scenes form inclusion in a proposed preview, scenes whose audio is categorized as neutral in terms of emotion may be discarded, e.g., in a subsequent filtering stage of the workflow.

In various embodiments, for scenes which do not comprise speech (which may be identified using a speech detector machine learning model) but do contain sounds, a non-speech audio classifier may be used. The non-speech audio classifier may for example categorize an audio clip as one comprising any of several hundred types of sound, such as instrumental music, environmental sounds, animal sounds, industrial sounds, traffic sounds etc. In some embodiments, for each genre, a set of important, compatible, or characteristic (non-speech) audio categories may be identified, and the mappings between the genres and the characteristic audio categories may be stored in a knowledge base of the analytics service. Segments that comprise non-mapped audio may be discarded from further consideration in the filtering step of the workflow in such embodiments.

An audio-to-plot-summary-similarity score may be computed in some embodiments for each segment. For example, a D1-dimensional embedding vector may be generated from the audio content alone of the segment (ignoring the video content) (where D1 is a tunable parameter), and a D1-dimensional embedding vector may also be generated from the text plot summary of the video as a whole in such embodiments. A similarity metric (such as a cosine similarity) may be computed between the two embedding representations. The motivation for computing such metrics is that segments which are more relevant to the plot may in general have a higher similarity metric value, while segments which are less relevant to the plot may have a lower similarity metric score.

A number of different machine learning models and tools may be used to analyze the video content of a segment (independently of the audio content) in at least some embodiments in the feature extraction phase of the workflow. Face detection models may be used to distinguish among all the faces within a given segment, and face-based emotion detection models may be used to identify the predominant emotion (or several significant emotions) indicated by the faces. Face angle or tilt information may be computed in some embodiments as part of face detection (or using separate models); the tilt analysis may be conducted, for example, under the assumption that faces shown primarily frontally or head-on are more likely to be appealing in a preview that faces shown at angles. In the filtering stage, in some embodiments, segments with faces with substantial tilt may be eliminated.

According to some embodiments, an embedding-based similarity detection algorithm or model may be employed for video content (similar to the embedding-based technique discussed above for audio content). An embedding representation of the video content of the segment may be generated within a D2-dimensional space (where D2 is a tunable parameter), and an embedding representation of the plot summary may also be generated within the same D2-dimensional space. A metric of similarity (e.g., cosine similarity) between the two embedding representations may be computed and used as another measure of how relevant the segment is to the plot.

In one embodiment, a machine learning model may be employed to automatically generate a text description of the video content of a segment. Another model (e.g., a multi-lingual sentence analysis model similar to Sentence BERT (bidirectional encoder representation from transformers)) may then be used to generate a D3-dimensional embedding from the text description. An embedding of the plot summary in the same D3-dimensional space may be generated, and a similarity metric between the two embeddings may be computed as another video-based feature.

In embodiments in which the input data set includes subtitles, and a given segment includes subtitles, another embedding-based similarity metric may be computed. A machine learning model (e.g., a multilingual sentence analysis model similar to Sentence BERT) may be used to generate a D4-dimensional embedding from the subtitles. An embedding of the plot summary in the same D4-dimensional space may be generated, and a similarity metric between the two embeddings may be computed as text-based feature. A similar approach may be used for scripts and/or transcriptions of the dialog of individual segments.

One or more filtering and score generation algorithms 216 may be employed in various embodiments after the features have been extracted from the segments. Different criteria (which utilize at least some of the extracted features) may be employed for filtering out less appealing or less relevant segments, depending on whether the segment video contains faces in some embodiments, as discussed in further detail below. In some embodiments, respective weighted preview-suitability scores may be generated for at least some segments that have been retained during the filtering, and then the scores may be used to rank segments within each of several chronological buckets or sub-units of the kind described below.

According to some embodiments, a formula similar to the following may be employed to obtain the preview-suitability score for segments containing faces:

$$s_i = w_a f_{ai} + w_b f_{bi} + w_c f_{ci} + w_d f_{di} \quad \text{Formula A:}$$

In Formula A, i is the index or identifier of the segment, $s_i$ is the preview-suitability score of the segment, $f_{ai}$ is a subtitle-to-plot-summary similarity metric value, $f_{bi}$ is an audio-to-plot-summary similarity metric value, $f_{ci}$ is a video-to-plot-summary similarity metric value, and f di is a video-description-to-plot-summary similarity metric value. The similarity metrics values may be obtained using the embeddings of the corresponding data (e.g., subtitles, audio, video, and automatically-generated video description) and the embeddings of the plot summary as described above. $w_a$, $w_b$, $w_c$, and w d represent weights, which may for example be learned or derived empirically for various genres to which the video belongs. Note that in some embodiments, the genre to which a video belongs may be provided along with the video itself when requesting a preview; in other embodiments, an analytics tool may use machine learning or other techniques to determine or infer the genre. Similarly, a formula similar to the following may be employed to obtain the preview-suitability score for segments which do not include faces in at least one embodiment:

$$s_i = w_b f_{bi} + w_c f_{ci} + w_d f_{di} \quad \text{Formula B:}$$

The values of the genre-based weights used in Formula B may differ from the corresponding values in Formula A in some embodiments—that is, different weights may be attached to the similarity metrics for segments containing faces as opposed to segments that do not contain faces. In some embodiments, terms representing script content and/or transcriptions may be used in variants of Formula A and Formula B instead of or in addition to the terms used for subtitles.

In various embodiments, the original video may also be subdivided into chronological portions, also referred to as chunks, sub-units or buckets. For example, a 100-minute video may be divided into bucket B1 (containing the first 20 minutes of the 100 minutes), bucket B2 (containing the next 20 minutes) and so on. The proposed preview may then be assembled such that high preview-suitability segments from at least some of the buckets are included, while segments from the final bucket (which may reveal too many details about the conclusion of the video) are excluded. The chronological bucketing-based preview assembling algorithms 218 may take spoiler avoidance policies into account, as well as policies for arranging different classes of segments (e.g., scenes with faces versus segments without faces) relative to one another into account in at least some embodiments.

The proposed previews 220 generated/assembled may be presented to content owners/producers via viewing/editing tools 222 in the depicted embodiment. The content owners/producers may, if desired, modify the proposed previews using the editing tools before approving them in various embodiments. The approved previews 224 may eventually be displayed for content consumers, e.g., by streaming services at which the original videos can be streamed if desired by the content consumers. In at least some embodiments, different versions of previews for a given video may be generated in accordance with preview customization metadata 208. The metadata 208 may include information about the expected display capabilities of different target viewing devices (e.g., phones, TVs, tablets etc.), information about viewing preferences of different portions of the targeted audiences for a video, genre-related guidelines, and so on. The metadata may influence decisions made at one or more stages of the workflow—for example, previews of different total lengths may be created for different classes of viewing devices.

Figure 3:
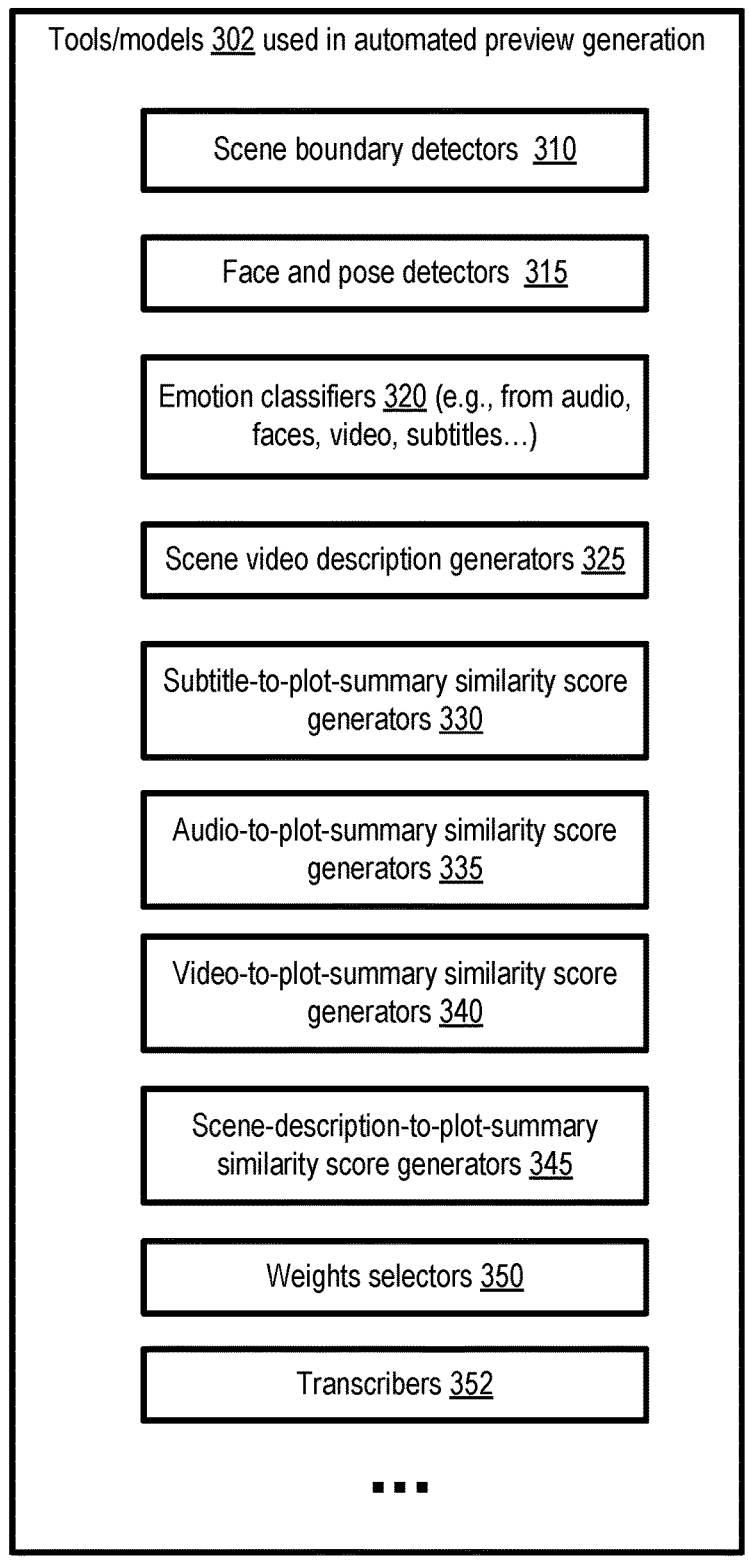
FIG. 3 illustrates example tools and machine learning models that may be employed to generate previews, according to at least some embodiments.

FIG. 3 illustrates example tools and machine learning models that may be employed to generate previews, according to at least some embodiments. The tools/models 302 used in automated preview generation of the kind introduced above may include scene boundary detectors 310 in various embodiments. The scene boundary detectors may utilize algorithms that compute statistics on differences in color properties among successive frames of a video to divide the video into segments for further per-segment analysis. Machine learning models that detect faces and poses/angles of faces may represent another class of tools used in the workflow for preview generation in various embodiments. Such face and pose detectors 315 may comprise deep neural network models in at least some embodiments.

Emotion classifiers 320 may be used to categorize segments of a video in terms of the predominant emotion (or set of emotions) expressed in the video, such as fear, anger, joy, and the like. Emotion classifiers can also be referred to as emotion recognition models or emotion detection models. Emotion classification for a segment may be performed independently for the video content or portion of the segment, the audio content or portion, the subtitles/script/transcription, and so on in some embodiments. In at least some embodiments, the emotion recognition models may be multi-lingual or language-agnostic, as they may be trained using input in a variety of languages. Scene video description generators 325 may be employed to automatically generate text descriptions/summaries of respective segments in some embodiments.

Embedding-based similarity score detection with respect to individual ones of the segments may be performed using a variety of tools in different embodiments. Such tools may be used to generate embeddings within the same multi-dimensional space of (a) some data associated with segment, and (b) the plot summary, and then compute the similarity between the two embeddings using a metric such as cosine similarity in some embodiments. The data used to generate the first of the two embeddings may comprise subtitles of the segment (in the case of subtitle-to-plot-summary similarity score generators 330), audio of the segment (in the case of audio-to-plot-summary similarity score generators 335), video of the segment (in the case of video-to-plot-summary similarity score generators 340), and scenes descriptions (generated automatically using scene video description generators 325, in the case of scene-description-to-plot-summary similarity score generators 345). In some embodiments, machine learning models may be used as weights selectors 350 for generating multi-factor weighted scores used to rank the different segments prior to final assembly of the proposed previews. In some embodiments, if a script or subtitles are not available, one or more transcribers 352 may be used to generate transcriptions of the audio of a video or of individual segments. In general, a variety of machine learning model types, such as deep neural networks that use convolutional neural networks (CNNs), attention networks, and the like may be employed for various stages of the automated preview generation workflow.

Figure 4:
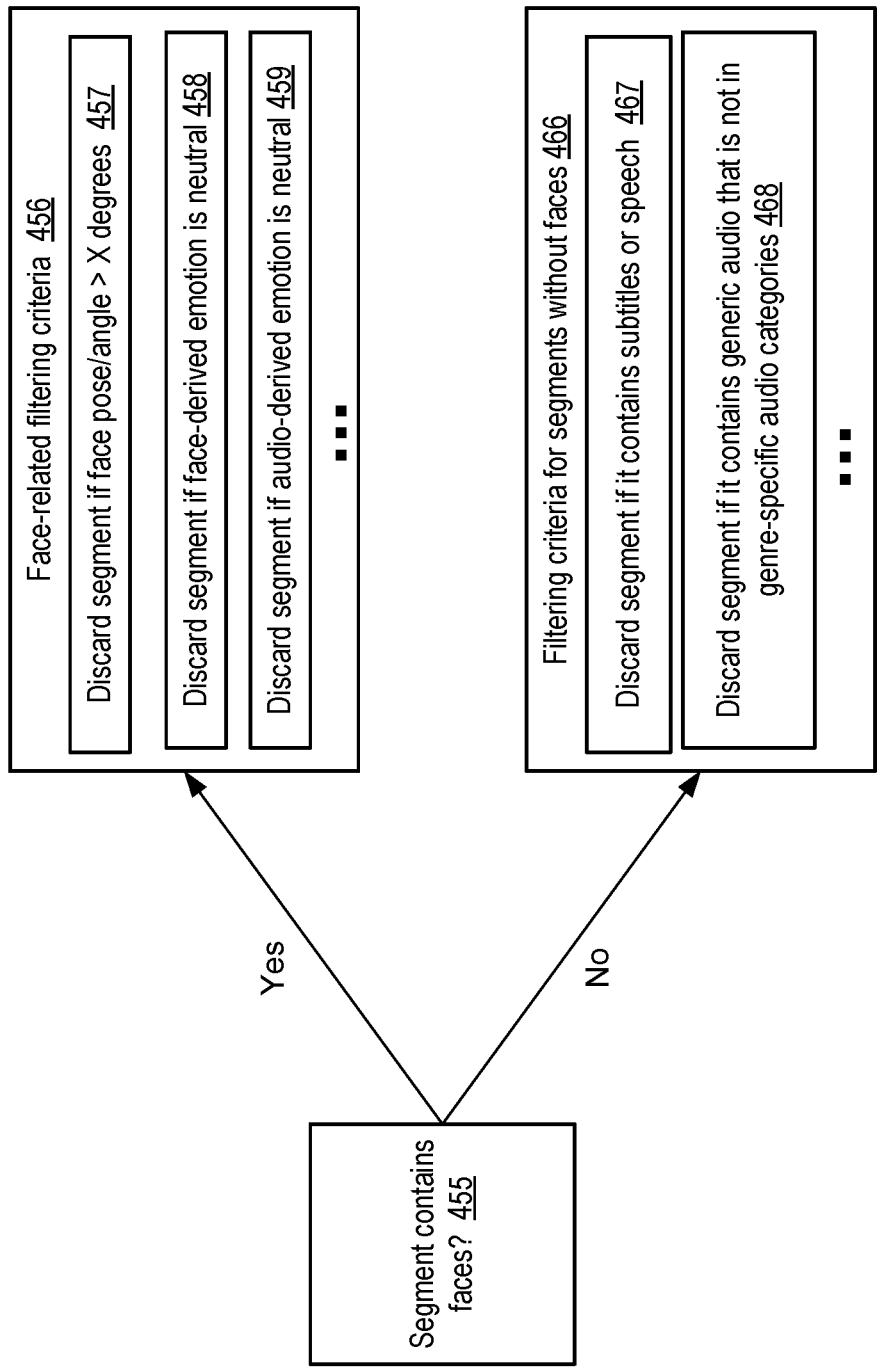
FIG. 4 illustrates example filtering techniques that may be applied to video segments during the creation of previews, according to at least some embodiments.

FIG. 4 illustrates example filtering techniques that may be applied to video segments during the creation of previews, according to at least some embodiments. In the embodiment shown in FIG. 4, different filtering criteria may be used to determine whether a segment should be analyzed further for possible inclusion in a preview, or whether the segment should be discarded with respect to such inclusion, depending on if the segment includes one or more faces (e.g., human faces, animal faces, cartoon character faces, animation faces, etc.) or not.

One or more machine learning models for detecting the presence of faces may be used to make the determination as to whether a segment contains faces 455. If the segment does contain faces, face-related filtering criteria 456 may include, for example, criteria pertaining to the angle or pose of the face(s) in the segment, and/or emotion-related features which may be associated with the presence of faces. In some embodiments, a segment which contains a face may be discarded if the angle at which the face is shown is such that the face cannot be seen very clearly, e.g., if the face is tilted away from the head-on or full-frontal position by more than X degrees as shown in element 457 (where X is a tunable parameter, or a parameter whose value is obtained from a knowledge base of the analytics service or tool being used). A segment with one or more faces may be discarded in some embodiments if face-derived emotion features indicate that the primary emotion associated with a segment is neutral, as shown in element 458, instead of a more clearly positive emotion (such as happiness) or a more clearly negative emotion (such as fear). In one embodiment, a segment containing a face may be discarded if the audio-derived features of the segment indicate that the segment's primary emotion is neutral, as shown in element 459. As such, the factors used for rejecting/retaining a segment containing faces for further analysis may not rely on visual features alone, but may use audio features in the depicted embodiment. In general, a variety of emotion-related features may be used as filtering criteria for segments comprising faces in some embodiments.

For segments that do not appear to include faces, at least some filtering criteria 466 may be based on audio features or properties in the depicted embodiment. For example, a segment without faces may be discarded if it contains subtitles or speech, as indicated in element 467. Such segments may not be considered very useful because speech without showing the speaker's face may cause confusion if the segments were to be included in the preview, for example. If a segment without faces has generic non-speech audio that does not belong to genre-dependent or genre-specific audio categories with respect to the genre to which the video as a whole belongs, the segment may be discarded in at least some embodiments, as shown in element 468. For example, if the genre of the video is "westerns", the background audio of a segment comprises classical music, and classical music is not considered well-matched with westerns in a genre-to-matching-audio-categories database used for preview generation, the segment may be discarded or filtered out in one embodiment. Other types of filtering criteria or rules, not shown in FIG. 4, may be employed during the automated preview generation workflow in various embodiments.

Figure 5:
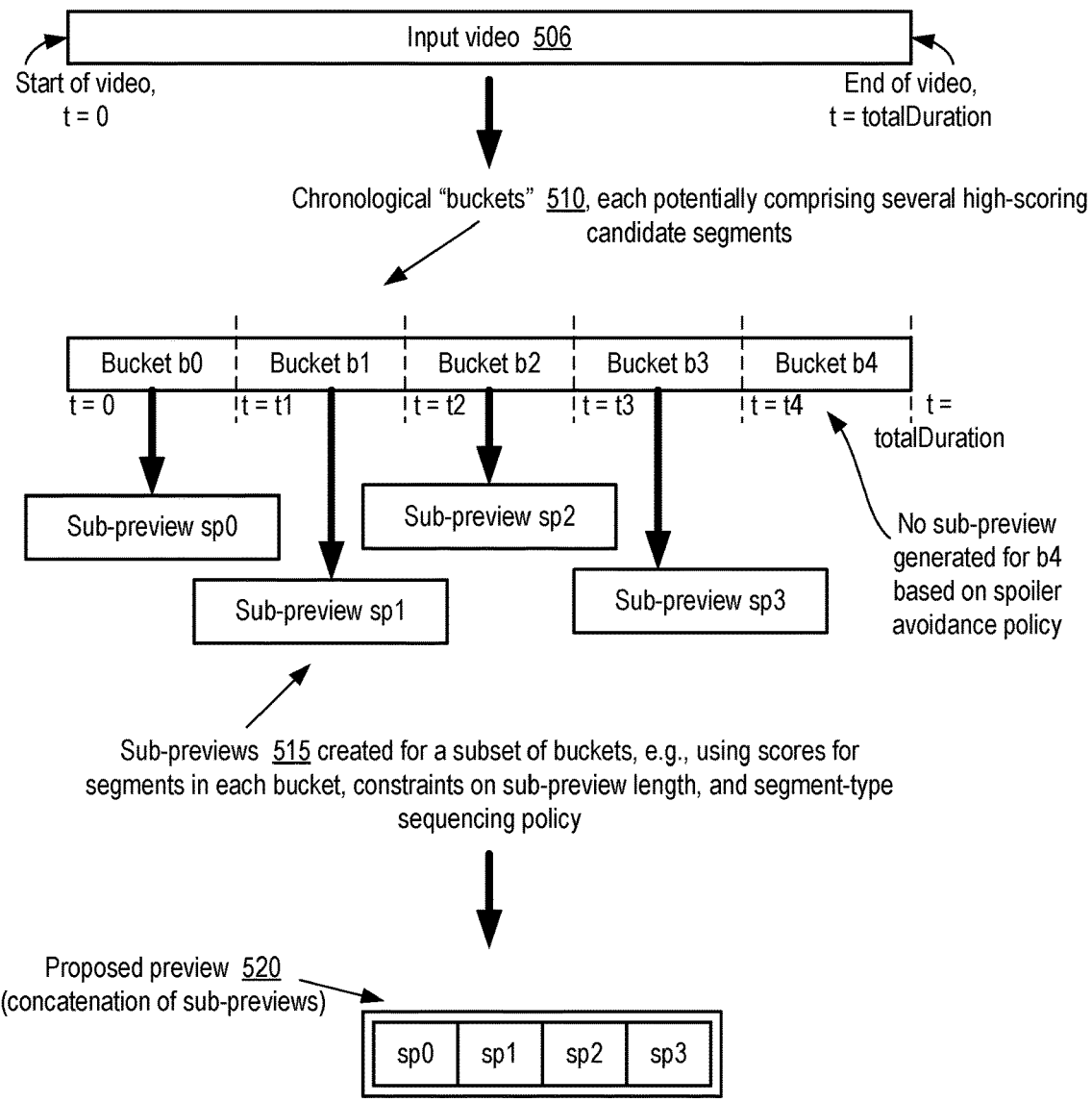
FIG. 5 illustrates example policies that may be employed to assemble a preview using chronological bucketing of videos, according to at least some embodiments.

FIG. 5 illustrates example policies that may be employed to assemble a preview using chronological bucketing of videos, according to at least some embodiments. In the depicted embodiment an input video 506 for which a proposed preview is to be generated automatically may be divided into a set of chronological buckets 510, with each bucket potentially several high-scoring candidate segments for inclusion in the proposed preview. As such, chronological buckets may typically be longer than individual segments. The division of the video into buckets may be referred to as "bucketing", with the number of buckets being selected based on heuristics from the knowledge base of the analytics service, and/or based on factors such as the overall length or duration (referred to as totalDuration in FIG. 5). For example, in one implementation, the number of chronological buckets may be set to 5. If start of the video along its timeline is referred to as t=0, and the end is referred to as t=totalDuration, the portion of the video between t=0 and approximately t=totalDuration/5 may be considered the first bucket b0 in the depicted embodiment. Note that the end time (t1) of the first bucket b0 may not necessarily be set to exactly totalDuration/5 so as not to split individual segments that are identified using the scene boundary detection algorithms described above in some embodiments; instead, for example, an effort may be made to ensure that each segment lies entirely within a bucket. In the scenario shown in FIG. 5, bucket b1 starts at t1 and ends at t2, bucket b2 starts at t2 and ends at tt3, bucket b3 starts at t3 and ends at t4, while bucket b4 starts at t4 and ends at totalDuration, with bucket boundaries being selected such that each of the buckets is approximately the same length. Respective proposed sub-previews (smaller previews representing a bucket rather than the entire video) may be generated for at least a subset of the chronological buckets in some embodiments, and then combined to form the overall proposed preview for the entire input video.

Under the assumptions that in most narratives, important aspects of the narrative are typically resolved close to the end of the narrative, and such resolutions should generally not be revealed in previews, a spoiler avoidance policy 501 may be employed in some embodiments. According to such a policy, segments from the last 1/nth of a video (where n is a tunable parameter) may be excluded from previews in one embodiment. For example, while sub-previews sp0, sp1, sp2 and sp3 may be created for buckets b0, b1, b2 and b3 in the scenario depicted, but no sub-preview may be generated for bucket b4 in accordance with the spoiler avoidance policy. In another embodiment, other types of spoiler avoidance policies may also or instead be used, such as a policy that excludes segments in which the deaths of important or frequently-reoccurring characters are shown.

A segment-type sequencing policy 502 may also be employed in the depicted embodiment when generating the sub-previews. In an effort to avoid monotony in the sub-previews, such a policy may for example state that in a sub-preview or preview, segments containing faces should generally be alternated with segments that do not contain faces, segments with background music should generally be alternated with segments that do not include background music, and so on.

Sub-previews 515 may be created form a subset of the buckets (e.g., buckets other than bucket b4) in the depicted embodiment. Some number of segments with the highest weighted scores from each bucket may be selected and ordered relative to one another using the segment-type sequencing policy, while ensuring that each sub-preview is shorter than a maximum sub-preview length. The sub-preview length may in turn be derived from (a) the overall maximum permitted length of the preview and (b) the number of buckets for which sub-previews are to be generated in some embodiments. For example, if the preview is to be no longer than 240 seconds, and 4 sub-previews are being generated, each sub-preview may be limited to 60 seconds. The proposed preview 520 may be generated by concatenating the sub-previews sp0, sp1, sp2 and sp3 in the depicted embodiment. Other types of policies than those shown in FIG. 5 may be employed in some embodiments for assembling the proposed previews from high-scoring segments.

In some embodiments, a weighted preview-suitability score of the kind described earlier may be computed for each segment and used during the sub-preview generation stage. Segments with faces within a given bucket may be sorted in decreasing order of the preview-suitability scores, and segments without faces within a given bucket may also be sorted in decreasing order of their scores. Then, the sub-preview may be generated for a given bucket by starting with the highest-score face-containing segment, then selecting the highest-score non-face-containing segment, then selecting the next highest-score face-containing segment, then selecting the next highest-score non-face-containing segment, and so on, until the sum of the durations of the selected segments for the bucket reaches the desired duration of the sub-preview. The selected scenes may then be combined in chronological order to form the sub-preview for the bucket in such an embodiment.

Figure 6:
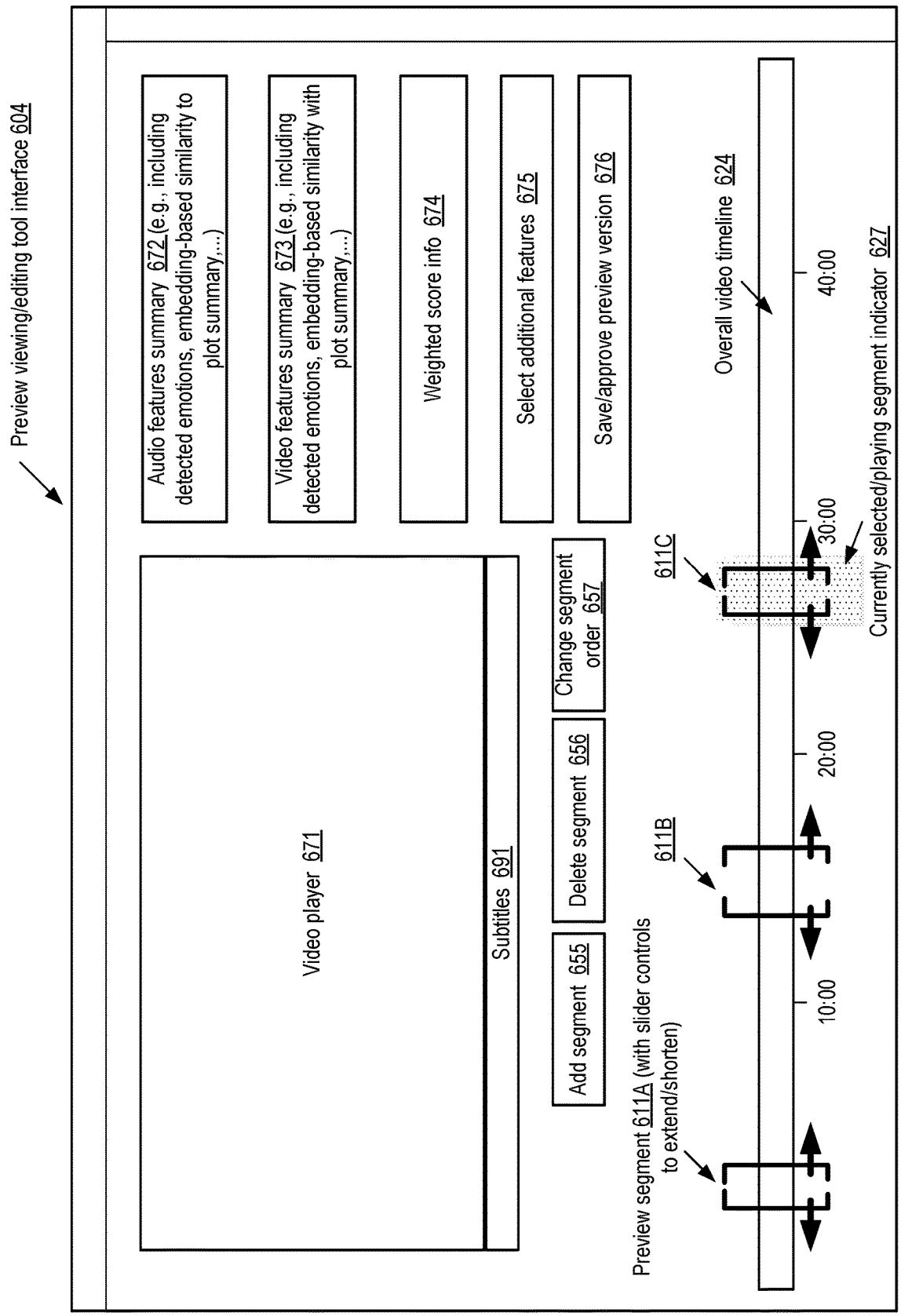
FIG. 6 illustrates example elements of an interface that may be supported for viewing and editing proposed previews, according to at least some embodiments.

FIG. 6 illustrates example elements of an interface that may be supported for viewing and editing proposed previews, according to at least some embodiments. Such interfaces may be used to present automatically generated proposed previews of video to content creators or content owners, enabling the content creators to make changes if desired and approve previews for presentation to content consumers in some embodiments. As shown, preview viewing/editing tool interface 604 may comprise a video player 671, within which the proposed preview may be displayed. The overall video timeline 624 may be displayed as a bar, within which segments that have been chosen for inclusion in the proposed preview may be indicated along with interactive controls that can be used to extend or shorten the segments if desired. For example, slider controls (indicated in FIG. 6 using brackets with attached arrows) may be used to lengthen or shorten the segments. In the scenario shown in FIG. 6, the proposed preview comprises preview segments 611A, 611B and 611C. Segment 611A occurs before the 10:00 minute marker shown along the video timeline 624, segment 611B occurs between the 10:00 and 20:00 markers, and segment 611C occurs between the 20:00 and 30:00 markers. A visual cue such as highlighting may be used to indicate which of the segments is currently being displayed in the video player 671 in some embodiments. For example, currently selected/playing segment indicator 627 shows that segment 611C is currently playing at the point in time corresponding to FIG. 6.

In the embodiment depicted in FIG. 6, the preview viewing/editing interface may include a number of interactive elements, in addition to the sliders for changing the lengths of included video segments, which can be used to change other aspects of a proposed preview. For example, an add segment element 655 may be used to introduce additional segments that are not part of the proposed video, a delete segment element 656 can be used to remove segments from the proposed preview, and a change segment order element 657 can be used to rearrange the sequence in which segments appear within the preview.

In addition to playing the proposed preview, interface 604 may be used to provide various kinds of auxiliary information pertaining to the proposed preview in the depicted embodiment. For example, the subtitles that accompany the displayed portion of the video (if any subtitles are available) may be shown in a subtitles region 691. An audio features summary section 672 may show emotions detected by analyzing the audio alone for the currently displayed segment, a measure of embedding-based similarity to the text plot summary for the audio of the currently displayed segment, and so on. A video features summary section 673 may show emotions detected by analyzing the video alone for the currently displayed segment, a measure of embedding-based similarity to the text plot summary for the video of the currently displayed segment, and so on. Information about the weighted score assigned to the segment being displayed may be provided in weighted score info region 674 in the depicted embodiment. The select additional features control element 675 may be used to view a list of additional features extracted for various segments from the input video, and the save/approve preview version control 676 may be used to indicate that that the preview (which may have been modified using interface 604) is now considered acceptable for presentation to potential content consumers such as streaming service customers. In various embodiments, interfaces with elements other than those shown in FIG. 6 may be employed for presenting and obtaining feedback from content creators or other entities involved with the production and distribution of videos.

Figure 7:
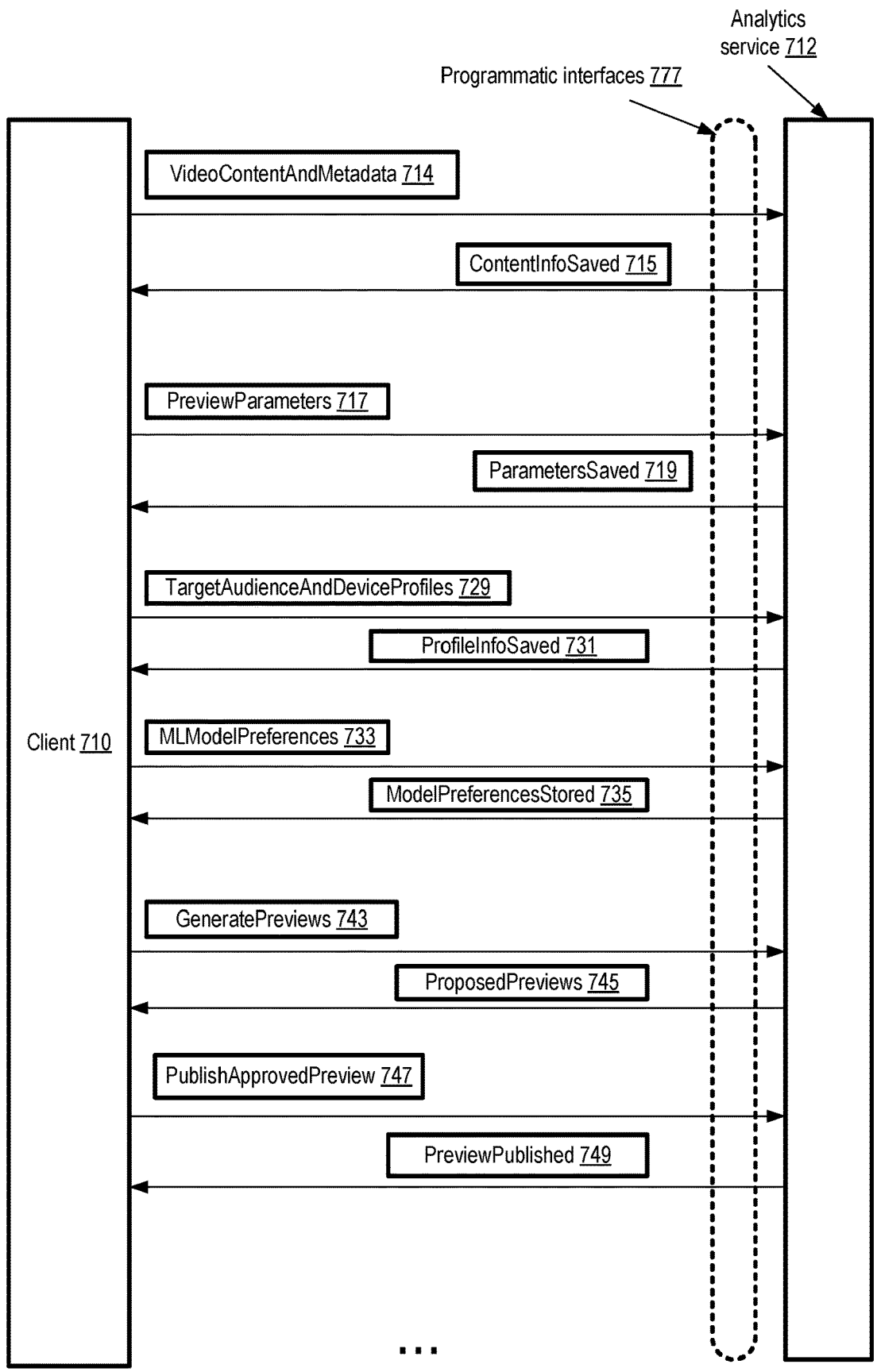
FIG. 7 illustrates example programmatic interaction associated with generating previews, according to at least some embodiments.

FIG. 7 illustrates example programmatic interaction associated with generating previews, according to at least some embodiments. An analytics service 712, similar in functionality to analytics service 102 of FIG. 1, may implement a set of programmatic interfaces 777 in the depicted embodiment, which may be used to clients 710 of the analytics service to submit messages/requests pertaining to automated preview generation and to receive corresponding responses. The programmatic interfaces 777 may include, among others, web-based consoles, command-line tools, graphical user interfaces, application programming interfaces (APIs) and the like in different embodiments.

A client 710 may submit a VideoContentAndMetadata message 714 in the depicted embodiment using programmatic interfaces 777, in which a pointer to an input video (e.g., a storage service location or a URI (universal resource identifier) from which a file comprising the input video can be accessed) for which a proposed preview is to be generated automatically may be provided. The VideoContentAndMetadata message may also include or indicate a text plot summary for the video, a source from which subtitles can be obtained (if the subtitles are stored in a location other than the video itself), information about the genre of the video, a script, and so on. The information about the video may be saved at the analytics service, and a ContentInfoSaved message 715 may be sent to the client in some embodiments.

The client may provide preferences or guidelines for various parameters to be used during the generation of the preview, e.g., via one or more PreviewParameters messages 717 in the depicted embodiment. The parameters may, for example, include the desired total length of the preview, the total number of distinct segments that should be included in the preview, a spoiler avoidance policy of the kind discussed earlier, a segment-type sequencing policy, and so on. The parameters may be stored at the analytics service, e.g., within a parameters/policies database similar to database 144 shown in FIG. 1, and a ParametersSaved message 719 may be sent to the client.

In some embodiments, a client may wish to obtain several different automatically-generated previews for the same input video, with each preview being tailored for a particular content consumer audience segment and/or for a particular class of targeted preview viewing device (such as phones, tablets, large-screen high-definition TVs, etc.). A client 710 may submit one or more TargetAudienceAndDeviceProfiles messages 729 indicating profiles of the targeted video consumer audiences (e.g., video-watching preferences of various groups of potential consumers/watchers of the video) and/or indications of the types of devices for which respective versions/variants of previews are to be generated. The information provided may be saved at the analytics service, and a ProfileInfoSaved message 731 may be sent to the client. In at least some embodiments, the profile information provided about the target video consumer audiences or demographics may include factors that can be used to filter or assign weights to individual segments of a video. For example, the profile information may indicate that the video is targeted primarily to young men in the age range 18-30, and that previews highlighting numerous fast-moving action segments are likely to be of most interest to the targeted audience, and such information may be used to customize the preview(s) that are generated automatically by the analytics service.

A client that is knowledgeable regarding machine learning may use an MLModelPreferences message 733 to specify preferences or requirements for the kinds of models, specific model versions, and the like that should be employed for the automated generation of a preview. The client's preferences may be saved and a ModelPreferencesStored message 735 may be sent to the client in at least some embodiments. In one embodiment, the analytics service may inform the client either that the client's preferred models will be used, or that while the client's preferred models may not currently be available for use, similar models will be used.

A GeneratePreviews request 743 may be sent by a client to trigger a workflow similar to that shown in FIG. 2, which results in the creation of one or more proposed previews for the input video. The proposed preview or previews may be presented in the form of one or more ProposedPreviews messages 745 in the depicted embodiment, e.g., via viewing/editing interfaces similar to the interface shown in FIG. 6. If the client wishes to modify the proposed preview before approving it for publication or distribution, the client may do so via the programmatic interfaces 777. If desired, the client may eventually send a PublishApprovedPreview message 747, indicating a version of the proposed preview (either the original version, or a modified version) that can be transmitted or propagated to one or more destinations (such as a streaming service). The analytics service may propagate the approved preview to the specified destination(s), and send a PreviewPublished message 749 to the client in at least some embodiments. In some embodiments, programmatic interactions other than those shown in FIG. 7 may be supported by an analytics service with respect to the automated generation of previews.

Figure 8:
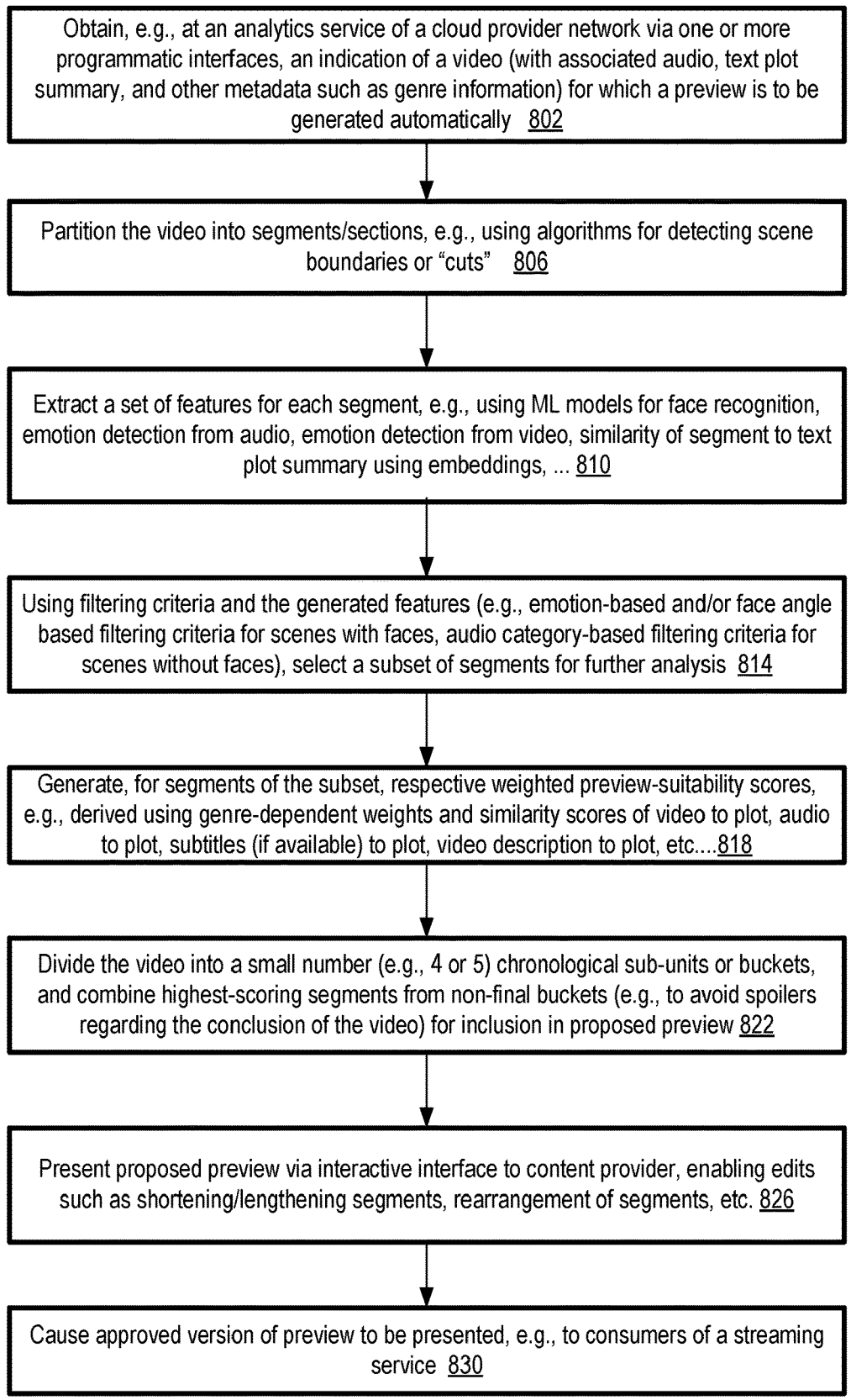
FIG. 8 is a flow diagram illustrating aspects of operations that may be performed to automatically generate previews for videos, according to at least some embodiments.

FIG. 8 is a flow diagram illustrating aspects of operations that may be performed to automatically generate previews for videos, according to at least some embodiments. As shown in element 802, an indication of an input video for which a preview is to be generated automatically may be obtained, e.g., via one or more programmatic interfaces of an analytics service of a cloud provider network. In addition to the video itself (which may comprise a plurality or sequence of frames), associated audio, a text plot summary and/or other metadata such as genre information or subtitles may also be obtained in various embodiments.

The video may be divided or partitioned into segments/sections (element 806), e.g., using a partitioning algorithm that detects "cuts" or scene boundaries using statistical analysis of differences in color and/or other visual properties between successive frames in some embodiments. For example, while the overall duration of the video may be 60-90 minutes in some cases, individual segments may typically be no more than a few minutes or even a few seconds long.

Corresponding to each segment, a respective set of features may be extracted or obtained using one or more machine learning models in different embodiments (element 810). Any of a variety of different models may be employed in different embodiments, such as the kinds of models/tools discussed in the context of FIG. 3. The models may be used for detecting/recognizing faces, determining poses/angles of faces, classifying segments based on emotions detected from audio content alone, classifying segments based on emotions detected from emotions from video content, generating embedding-based similarity metrics between segments and the plot summary, generating descriptions from scene video content, and so on.

Using one or more filtering criteria and the generated features, a subset of the segments may be selected for further analysis (element 814), while the remainder may be discarded. In some embodiments, different filtering criteria may be used for segments comprising faces than are used for segments that do not include faces. For face-containing segments, for example, emotion-based filtering criteria may be used, while segments that do not include faces may be filtered based on the compatibility of audio of the scenes (which may have been classified into one of a set of audio categories) with the genre to which the video belongs in some embodiments.

For various segments of the selected subset, a respective weighted preview-suitability score may be assigned, generated or computed in the depicted embodiment (element 818). Genre-dependent weights may be used to assign the weighted preview-suitability scores in some embodiments along with similarity metrics (e.g., between the video content of a given segment and the overall plot, between the audio content and the overall plot, between an automatically-generated description and the overall plot, and so on).

To avoid revealing too many details/conclusions about the narrative of the video within the preview, and thereby reducing suspense and interest in the video, a spoiler-avoidance policy may be implemented in some embodiments. According to such a policy, the video may also be divided into a small number (e.g., 4 or 5) of chronological sub-units or buckets, where each sub-unit or portion may include one or more of the segments to which the preview-suitability scores are assigned (element 822). Instead of using segments from all the sub-units or buckets, high-scoring segments from a subset of the sub-units may be selected for inclusion in the proposed preview in various embodiments—for example, segments from the final sub-unit (during which may of the plot lines may be resolved) may not be included in the proposed preview.

The proposed preview may be presented via an interactive editing interface to the content provider or creator of the video (element 826) in at least some embodiments. The interface may allow the content creator to modify/edit the proposed preview if desired, e.g., by lengthening segments, shortening segments, rearranging or re-sequencing segments and so on. After the content creator has approved the preview, the approved version may in turn be presented to content consumers (element 830), e.g., to consumers/customers of a video streaming service. In one embodiment, for example, a preview may be shown for a video if a consumer hovers a mouse or similar device over an icon representing the video. It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
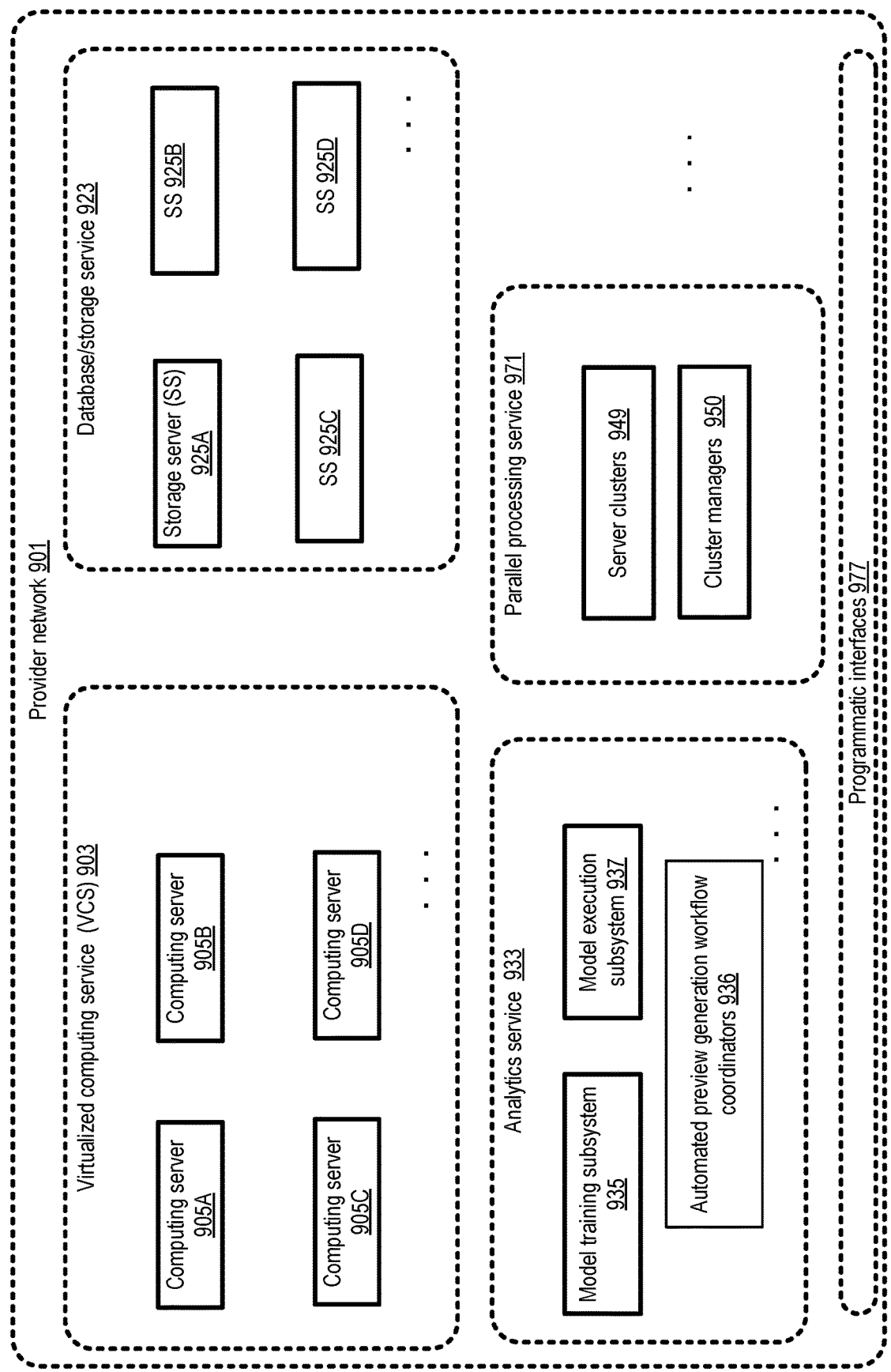
FIG. 9 illustrates an example provider network at which previews may be generated automatically for videos, according to at least some embodiments.

In some embodiments, as mentioned earlier, an analytics service that can be utilized to generate previews automatically may be implemented as part of a cloud provider network or cloud computing environment. FIG. 9 illustrates an example provider network at which previews may be generated automatically for videos, according to at least some embodiments. In the depicted embodiment, provider network 901 may comprise resources used to implement a plurality of services, including for example a virtualized computing service (VCS) 903, a database/storage service 923, a parallel processing service 971 as well as an analytics service 933 (which may also be referred to as a machine learning service). The analytics service 933, similar in features and functionality to analytics service 102 of FIG. 1, may comprise a training subsystem 935 and a model execution subsystem 937 for at least some of the machine learning models used during preview generation, as well as a set of preview generation workflow coordinators 936.

Components of a given service of a provider network may utilize components of other services in the depicted embodiment—e.g., for some tasks such as feature generation techniques of the kind discussed above, virtual machines or compute instances implemented at computing servers such as 905A-905D of the virtualized computing service 903 may be used by the analytics service, videos and associated metadata, training data sets as well as model execution results may be stored at storage servers 925 (e.g., 925A-925D) of database/storage service 923, and so on.

For some types of complex or large-scale tasks initiated at the analytics service 933, server clusters 949 may be utilized with the help of cluster managers 950 in one embodiment. The cluster managers 950 may for example assign particular clusters to clients, keep track of cluster health and take administrative actions such as replacing failed or poorly-performing servers, and the like. The server clusters may themselves comprise compute instances of the VCS in some cases. Individual ones of the services shown in FIG. 9 may implement a respective set of programmatic interfaces 977 which can be used by external and/or internal clients (where the internal clients may comprise components of other services) in the depicted embodiment. In at least some embodiments, resources of a cloud provider network may not be required for generating previews automatically using the kinds of techniques introduced above; instead, for example, a standalone set of tools may be used.

A provider network 901 can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an analytics service may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

The cloud provider network may implement various computing resources or services, which may include an analytics service, a virtual computing service (VCS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A virtualized computing service (VCS) 903 of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for the preview generation workflow. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances, some of which may have access to hardware accelerators (e.g., incorporated within cards connected via Peripheral Component Interconnect—Express (PCIe) links to the primary processors of virtualization servers at which the compute instances are run) may be used to generate previews in different embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Machine learning models and other tools used for preview generation may be run using containers in at least some embodiments.

The traffic and operations of the cloud provider network, and individual services such as the analytics service, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 10:
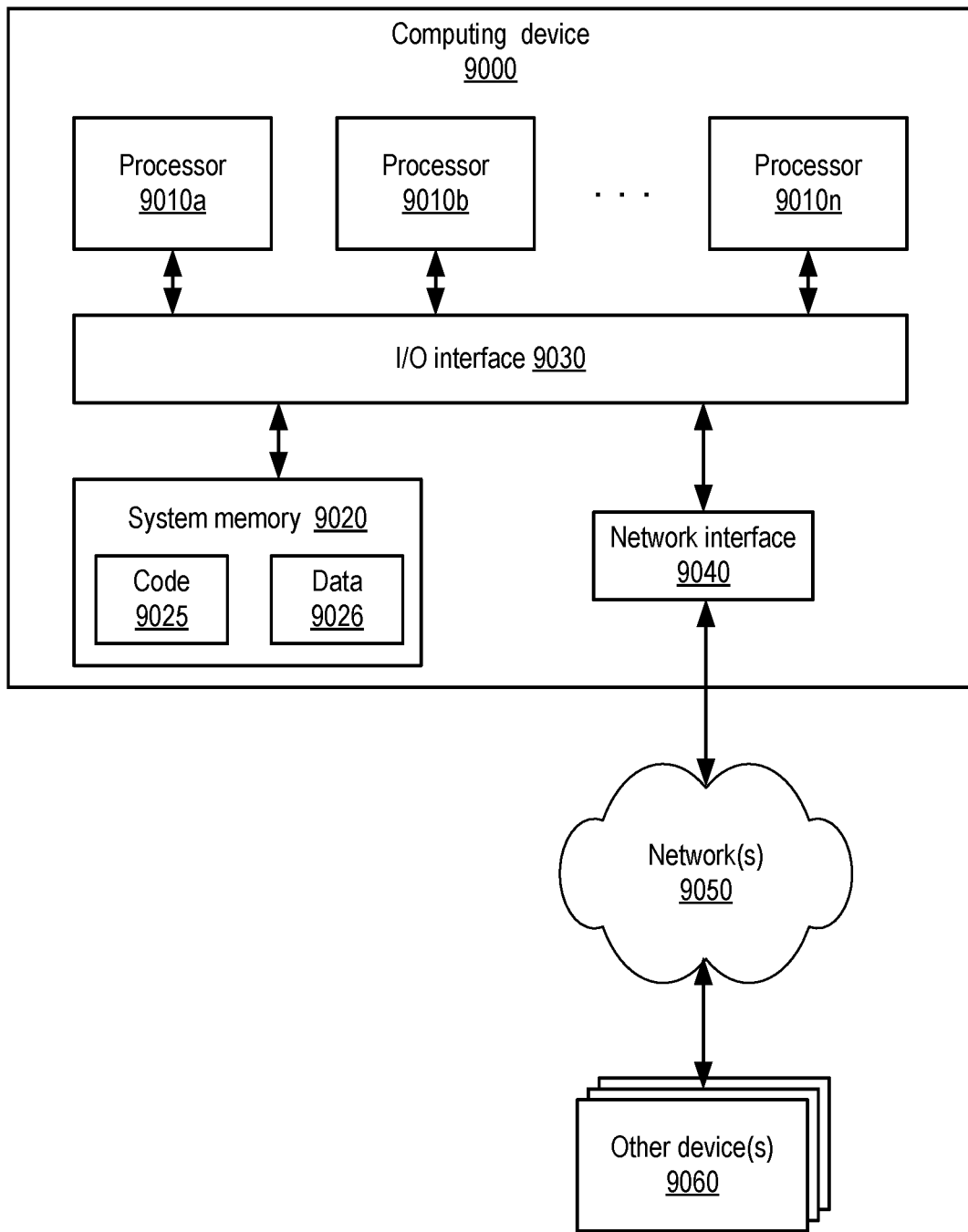
FIG. 10 is a block diagram illustrating an example computing device that may be used in at least some embodiments.

In at least some embodiments, a server that implements the types of techniques described herein (e.g., various functions of an analytics service, an entertainment content presentation service, and/or other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
obtain, via one or more programmatic interfaces from an entertainment content provider, an indication of (a) a video for which a preview is to be generated automatically, (b) audio associated with the video, and (c) a text plot summary of the video;
divide the video into a plurality of segments;
extract, from individual segments of the plurality of segments using one or more machine learning models, a respective set of features, including at least a first emotion-related feature associated with analysis of visual content of a segment, a second emotion-related feature associated with analysis of audio of the segment, and a first metric of similarity between the segment and the text plot summary;
select a subset of segments of the plurality of segments using at least some features of the respective sets of features and a collection of filtering criteria, wherein the collection of filtering criteria includes at least one emotion-based filtering criterion;
assign, to individual segments of the subset, respective weighted preview-suitability scores using a combination of metrics, wherein the combination of metrics includes the first metric of similarity between the individual segments and the text plot summary;
combine at least some segments of the subset, identified from the subset using at least the respective weighted preview-suitability scores, to generate a proposed preview for the video; and
cause the proposed preview to be presented via an interactive editing interface.

2. The system as recited in claim 1, wherein the one or more machine learning models include a multi-lingual emotion recognition model trained using input in a plurality of languages.

3. The system as recited in claim 1, wherein the one or more machine learning models including a model which generates, within a particular embedding space, (a) a first representation of audio or video of a segment of the plurality of segments and (b) a second representation of the plot summary, wherein the first metric of similarity is generated using the first representation and the second representation.

4. The system as recited in claim 1, wherein the one or more computing devices include further instructions that upon execution on or across the one or more computing devices:
obtain a script, subtitles, or an audio content transcription for at least a particular segment of the video, and wherein a set of features extracted for the particular segment includes at least one feature derived from the script, subtitles, or the audio content transcription.

5. The system as recited in claim 1, wherein the one or more computing devices include further instructions that upon execution on or across the one or more computing devices:
obtain, via the interactive editing interface, input indicating that a particular segment included in the proposed preview is to be shortened, extended or eliminated; and
store a modified version of the proposed preview in accordance with the input.

6. A computer-implemented method, comprising:
extracting, from individual ones of a plurality of segments of a video for which a preview is to be generated automatically, a respective set of features, including at least a first emotion-related feature associated with analysis of visual content of a segment and a second emotion-related feature associated with analysis of audio content of the segment;
selecting a subset of segments of the plurality of segments using at least some features of the respective sets of features and a collection of filtering criteria, wherein the collection of filtering criteria includes at least one emotion-based filtering criterion;
assigning, to individual segments of the subset, respective weighted preview-suitability scores using a combination of metrics, wherein the combination of metrics includes a first metric of similarity between the individual segments and a plot summary of the video; and
combining, using at least the respective weighted preview-suitability scores, at least some segments of the subset to generate a first proposed preview for the video.

7. The computer-implemented method as recited in claim 6, further comprising:
dividing the video into the plurality of segments using an algorithm that determines segment boundaries based at least in part on analysis of differences in color properties among successive frames of the video.

8. The computer-implemented method as recited in claim 6, further comprising:
dividing the video into a sequence of chronological portions, wherein individual ones of the chronological portions include one or more segments of the plurality of segments, and wherein the combining comprises including, in the first proposed preview, at least one segment from a selected subset of chronological portions.

9. The computer-implemented method as recited in claim 8, wherein in accordance with a spoiler avoidance policy, the selected subset of chronological portions does not include at least one chronological portion of the sequence.

10. The computer-implemented method as recited in claim 6, wherein extracting the respective set of features comprises utilizing one or more machine learning models including a multi-lingual emotion recognition model trained using input in a plurality of languages.

11. The computer-implemented method as recited in claim 6, wherein extracting the respective set of features comprises utilizing one or more machine learning models including a model which generates, within a particular embedding space, (a) a first representation of audio or video of a segment of the plurality of segments and (b) a second representation of the plot summary, wherein the first metric of similarity is generated using the first representation and the second representation.

12. The computer-implemented method as recited in claim 6, wherein the collection of filtering criteria comprises a first filtering criterion for segments comprising faces and a second filtering criterion for segments that do not include faces, the computer-implemented method further comprising:
determining, using one or more machine learning models, that (a) a particular segment of the plurality of segments includes a face and (b) another segment of the plurality of segments does not include a face, wherein selecting the subset of segments comprises:

applying the first filtering criterion to the particular segment and applying the second filtering criterion to the other segment.

13. The computer-implemented method as recited in claim 6, further comprising:

obtaining an indication, via a programmatic interface, of a genre of the video; and utilizing the genre to exclude at least some segments of the plurality of segments from the first proposed preview.

14. The computer-implemented method as recited in claim 6, further comprising:

determining a duration of the first proposed preview based at least in part on a first preview consumption target device type; and generating, corresponding to a second preview consumption target device type, a second proposed preview of the video, wherein a duration of the second proposed preview differs from a duration of the first proposed preview.

15. The computer-implemented method as recited in claim 6, further comprising:

determining a first profile of a first targeted video consumer audience, wherein at least one segment of the plurality of segments is included in the first proposed preview based on the first profile; and generating a second proposed preview of the video, based at least in part on a second profile of a second targeted video consumer audience.

16. One or more non-transitory computer-accessible storage media storing program instructions that when executed on or across one or more processors:

extract, from individual ones of a plurality of segments of a video for which a preview is to be generated automatically, a respective set of features, including at least a first emotion-related feature associated with analysis of visual content of a segment and a second emotion-related feature associated with analysis of audio content of the segment;

select a subset of segments of the plurality of segments using at least some features of the respective sets of features and a collection of filtering criteria, wherein the collection of filtering criteria includes at least one emotion-based filtering criterion;

assign, to individual segments of the subset, respective weighted preview-suitability scores using a combination of metrics, wherein the combination of metrics includes a first metric of similarity between the individual segments and a plot summary of the video; and combine, using at least the respective weighted preview-suitability scores, at least some segments of the subset to generate a first proposed preview for the video.

17. The one or more non-transitory computer-accessible storage media as recited in claim 16, wherein extraction of the respective set of features comprises utilizing one or more machine learning models including a multi-lingual emotion recognition model trained using input in a plurality of languages.

18. The one or more non-transitory computer-accessible storage media as recited in claim 16, wherein extraction of the respective set of features comprises utilizing one or more machine learning models including a model which generates a description of a particular segment.

19. The one or more non-transitory computer-accessible storage media as recited in claim 16, wherein the collection of filtering criteria comprises a first filtering criterion for segments comprising faces and a second filtering criterion for segments that do not include faces, and wherein the one or more non-transitory computer-accessible storage media store further program instructions that when executed on or across the one or more processors:

determine, using one or more machine learning models, that (a) a particular segment of the plurality of segments includes a face and (b) another segment of the plurality of segments does not include a face, wherein selection of the subset of segments comprises:

applying the first filtering criterion to the particular segment and applying the second filtering criterion to the other segment.

20. The one or more non-transitory computer-accessible storage media as recited in claim 16, storing further program instructions that when executed on or across the one or more processors:

obtain an indication via a programmatic interface, of a genre of the video; and utilize the genre to exclude at least some segments of the plurality of segments from the first proposed preview.

* * * * *